(12) United States Patent
Reese (10) Patent No.: US 8,706,738 B2
(45) Date of Patent: Apr. 22, 2014

(54) SYSTEMS, METHODS AND MACHINE READABLE MEDIUMS TO SELECT A TITLE FOR CONTENT PRODUCTION

(75) Inventor: Byron William Reese, Georgetown, TX (US)

(73) Assignee: Demand Media, Inc., Santa Monica, CA (US)

( * ) Notice: Subject to any disclaimer, the term of this patent is extended or adjusted under 35 U.S.C. 154(b) by 549 days.

(21) Appl. No.: 12/856,477

(22) Filed: Aug. 13, 2010

(65) Prior Publication Data

US 2012/0041768 A1 Feb. 16, 2012

(51) Int. Cl.
*G06F 17/30* (2006.01)

(52) U.S. Cl.
CPC ............... *G06F 17/30864* (2013.01)
USPC ........................................... 707/748

(58) Field of Classification Search
CPC ............... G06F 17/30864; G06F 17/30867; G06F 17/30672
USPC ................................. 707/736, 748
See application file for complete search history.

(56) References Cited

U.S. PATENT DOCUMENTS

| 7,131,065 | B1 | 10/2006 | Kane |
| 8,244,585 | B1 * | 8/2012 | Huang et al. ............ 705/14.41 |
| 2004/0133469 | A1 * | 7/2004 | Chang .................... 705/14 |
| 2005/0233296 | A1 * | 10/2005 | Ziv-el et al. ............ 434/350 |
| 2007/0005597 | A1 * | 1/2007 | Williams ................. 707/6 |
| 2007/0005649 | A1 | 1/2007 | Wang et al. |
| 2007/0027850 | A1 * | 2/2007 | Chan et al. ................ 707/3 |
| 2008/0270376 | A1 * | 10/2008 | Svore et al. ............... 707/5 |
| 2008/0313158 | A1 * | 12/2008 | Lin ........................ 707/3 |
| 2010/0049709 | A1 | 2/2010 | Ravikumar et al. |
| 2011/0258054 | A1 * | 10/2011 | Pandey et al. ............ 705/14.72 |
| 2011/0313865 | A1 * | 12/2011 | Sinyagin et al. .......... 705/14.69 |

FOREIGN PATENT DOCUMENTS

KR 20070095506 A 10/2007

OTHER PUBLICATIONS

Yoon, Ju-Hyoung et al., "An Object Model of Korean Web Pages for Title Identification," 15th Annual Conference on Human and Cognitive Language Technology, pp. 18-21, 2003.
International Application No. PCT/US2011/042458, International Search Report and Written Opinion mailed Feb. 9, 2012.

* cited by examiner

*Primary Examiner* — Neveen Abel Jalil
*Assistant Examiner* — Matthew Ellis
(74) *Attorney, Agent, or Firm* — Greenberg Traurig, LLP (57) ABSTRACT

Systems, methods and machine-readable mediums to identify web page titles for content production are provided. The systems may include a storage device and a processor. The storage device may store a plurality of titles, each title is associated with a respective one of a plurality of web pages. The processor may be programmed to select a title from the plurality of titles and determine a value for the selected title. The value may be based on the number of times that the selected title appears in the plurality of titles, and on the number of web pages that link to the selected title. If the value is greater than a first threshold level, the processor may be programmed to identify the selected title for online publication.

16 Claims, 5 Drawing Sheets

FIG. 1

```
<!DOCTYPE html PUBLIC "-//W3C//DTD XHTML 1.0 Transitional//EN" "http://www.w3.org/TR/xhtml1/DTD/
    xhtml1-transitional.dtd">
<html xmlns="http://www.w3.org/1999/xhtml" id="www-ehow-com"
    xmlns:pas=""

xmlns:fb="http://www.facebook.com/2008/fbml"
    xmlns:og="http://opengraphprotocol.org/schema/"
    >
<head>
<title>How to Tie a Necktie for Beginners | eHow.com</title>
<meta http-equiv="Content-Type" content="text/html; charset=UTF-8" />
<meta name="wa_lr" scheme="DMINSTR2" content="en-US" />
<meta name="studioid" scheme="DMINSTR2" content="CC53E9CF-DD7B-4893-9F8A-F2B1989E57DB" />
<meta name="contentid" scheme="DMINSTR2" content="2306717" />
<meta name="category" scheme="DMINSTR2" content="Fasion, Style & Personal Care" />
```

Title Tag in HTML Code — 28

FIG. 2

How to Tie a Necktie For Beginners | eHow.com
How to Tie a Necktie For Beginners. Need to learn how to tie a tie the easy way? Look no further. In only seven easy steps, you will be a pro, ...
www.ehow.com › ... › Men's Fashion › Ties - Cached - Similar

How to Tie a Necktie For Beginners | Akira Daily News
Feb 2, 2010 ... Need to learn how to tie a tie the easy way? Look no further. In only seven easy steps, you will be a pro, using easy visuals to help ...
www.akiranews.com/2010/02/.../how-to-tie-a-necktie-for-beginners/ - Cached

How to tie a necktie for beginners
How to tie a necktie for beginners? Neckties have always been popular fashion accessories for quite some time now. They are one of the most essential ...
www.beauty-cosmetic-guide.com/fashion/necktie.htm - Cached

How to Tie a Necktie For Beginners | eHow.co.uk
How to Tie a Necktie For Beginners. Need to learn how to tie a tie the easy way? Look no further. In only seven easy steps, you will be a pro, ...
www.ehow.co.uk/how_2306717_tie-necktie-beginners.html - Cached

How to tie a necktie for beginners
How to tie a necktie for beginners? Neckties have always been popular fashion accessories for quite some time now. They are one of the most essential ...
101healthnews.com/fashion/necktie.htm

SYSTEMS, METHODS AND MACHINE READABLE MEDIUMS TO SELECT A TITLE FOR CONTENT PRODUCTION

FIELD

This disclosure relates generally to the selection of titles and more specifically to systems, methods and machine readable mediums to use existing web page titles to select a new title for content production.

BACKGROUND

The Internet can be viewed as a vast collection of web page documents. Although the exact number is not known, there are somewhere around twenty-five billion web pages on the Internet that reside on about two hundred million websites.

The majority of these twenty-five billion pages have what is known as a title tag—a piece of HTML code that resides in the document that tells a web browser what the title of the page is. The title tag, for instance, is what comes up in Google and other search engines when you do a search for a document.

It is estimated that there are at least twenty billion title tags associated with web pages on the internet. The mere presence of a web page with a certain title somewhere on the Internet does not in any sense imply that that page gets any traffic or makes any money.

SUMMARY

The present disclosure identifies which of those twenty billion titles are good candidates for online publication. Systems, methods and machine-readable mediums to identify titles for content production are provided. The systems may include a storage device and a processor. The storage device may store a plurality of titles, wherein each title is associated with a respective one of a plurality of web pages. The processor may be programmed to select a title from the plurality of titles and determine a value for the selected title. The value may be based on the number of times that the selected title appears in the plurality of titles, and on the number of web pages that link to the selected title. If the value is greater than a first threshold level, the processor may be programmed to identify the selected title for online publication. In one embodiment, the processor may be programmed to remove at least one nonessential word from each title of a plurality of titles. The at least one nonessential word is at least one of a brand name and a stop word.

In one embodiment, the processor may be further programmed with code instructions to select a title from a plurality of titles and determine a value for the selected title. The value may be based on the number of times that the selected title appears in the plurality of titles, and on the number of web pages that link to the selected title. If the value is greater than a first threshold level, the processor 20 may identify the selected title for online publication. In one embodiment, the processor may be further programmed with code instructions to publish a new web page associated with the selected title.

According to an embodiment of the present disclosure, the processor may be further programmed with code instructions to determine at least one n-gram for a group of the plurality of web pages having the selected title and determine an n-gram score for each respective n-gram. In one embodiment, the n-gram score may be determined by multiplying the number of web pages in the group of web pages by a number of occurrences of the respective n-gram in the group of web pages. The processor may be further programmed with code instructions to select a first n-gram score determined for a first n-gram and associate a search term bid price with the first n-gram score. The first n-gram score being greater than a second n-gram score determined for a second n-gram of the at least one n-gram. The processor may be further programmed with code instructions to identify the selected title for online publication if the search term bid price is greater than a second threshold level.

Computer-implemented methods for identifying web page titles for content production are also provided. The computer-implemented methods include selecting, via at least one processor, a title from a plurality of titles, and determining, via the at least one processor, a value for the selected title. The value is based on the number of times that the selected title appears in the plurality of titles, and on the number of web pages that link to the selected title. The computer-implemented methods may further include identifying the selected title for online publication if the value is greater than a first threshold level.

The computer readable mediums provide instructions to cause the processor to perform the operations above.

Many features and embodiments of the present invention will be apparent from the accompanying drawings and from the following detailed description.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

In the description that follows, the present disclosure may be described in reference to one or more embodiments to identify web page titles for content production. The present inventions, however, are not limited to any particular application nor is it limited by the examples described below. Various modifications to the disclosed embodiments may be apparent to those skilled in the art and the general principles defined herein may be applied to other embodiments and applications without departing from the spirit and scope of the inventions. Therefore, the description of the embodiments that follow are for purposes of illustration and not limitation.

Reference in this specification to "one embodiment", "an embodiment", "other embodiments", or the like means that a particular feature, structure, or characteristic described in connection with the embodiment is included in at least one embodiment of the disclosure. The appearances of, for example, the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Systems, methods and machine-readable mediums to identify titles for content production are provided. The computer-implemented methods include selecting, via at least one processor, a title from a plurality of titles, and determining, via the at least one processor, a value for the selected title. The value may be based on the number of times that the selected title appears in the plurality of titles, and on the number of web pages that link to the selected title. The computer-implemented methods may further include identifying the selected title for online publication if the value is greater than a first threshold level. For example, if a title has one occurrence on the Internet with a 1000 inbound links, the value for the title may be addition of both values with a result of 1001. If the first threshold level is 1005, then this title does not meet the threshold requirement for online publication. The abovementioned features of the present disclosure will become more apparent in the following description.

Figure 1:
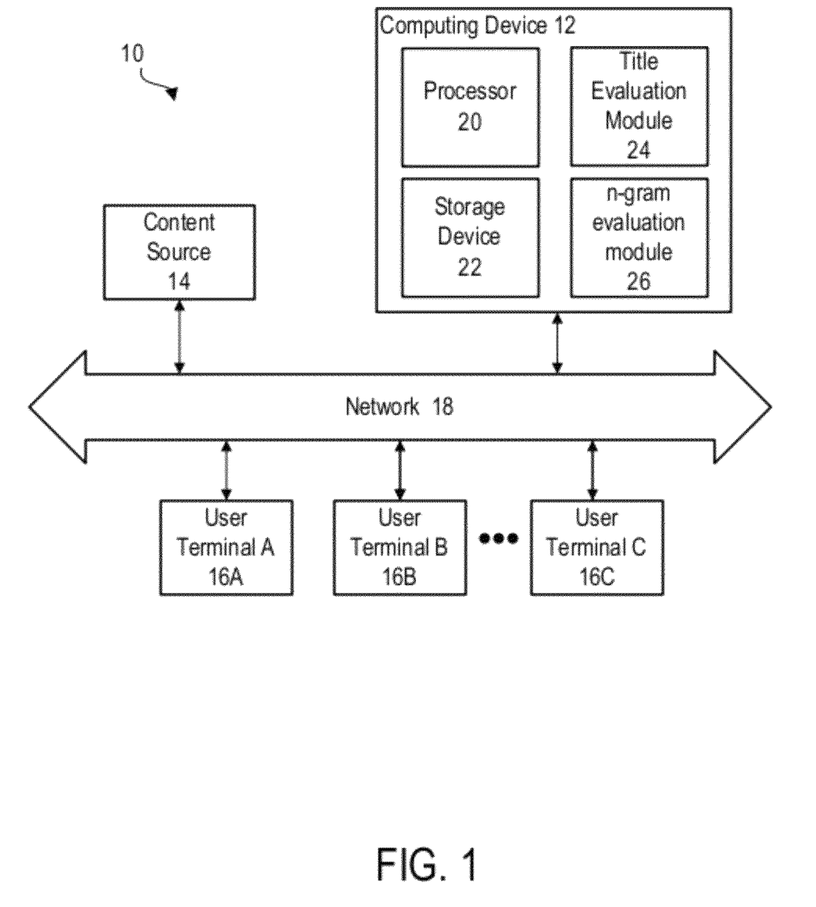
FIG. 1 illustrates an exemplary block diagram of a data processing system for identifying web page titles for content production, according to one embodiment of the present disclosure.

FIG. 1 illustrates an exemplary block diagram of a data processing system 10 for identifying web page titles for content production, according to one embodiment of the present disclosure. The system 10 may include at least one computing device 12, a content source 14, and at least one user terminal 16. The components of the system 10 may be distributed over a network 18. The network 18 may be an internet or intranet, or a combination thereof. For example, the components of the system 10 may be selectively distributed over the Internet as well as maintained within an intranet of an organization. In one embodiment, the terminal 16 may run commercially-available Web browser applications such as Microsoft Internet Explorer®, which implements World Wide Web standards such as HTTP, HTML, XML, java, Flex, Ajax and the like.

In one embodiment, the computing device 12 may include at least one processor 20, one or more modules and one or more databases. For example, the computing device 12 may include a storage device 22, a web page title evaluation module 24, and an n-gram evaluation module 26. The at least one processor 20 may be a commercially-available processor which accesses the content source 14 and/or dynamically generates Web pages in response to end user actions. The Web pages may be in the form of HTML pages or the like. For example, the Web pages generated may provide a search result that includes one or more content material associated with a search term and are listed in a specific order determined according to an embodiment of the present disclosure, as discussed further below.

In one embodiment, any portion of the storage device 22 can be provided externally from the computing device 12, either locally to the computing device 12 or remotely over the network 18. The external data from an external storage device can be provided in any standardized form which the processor 20 can understand. For example, an external storage device at a provider can advantageously provide content material in response to requests from the processor 20 in a standard format, such as, for example, images, videos, audios, text-based material and the like, which the processor 20 may then transform into a function call format that the code module(s) can understand. The processor 20 may be a standard SQL server, where dynamic requests from the server builds forms from one or more databases used by the computing device 12 as well as store and retrieve related data on the storage device.

Figure 2:
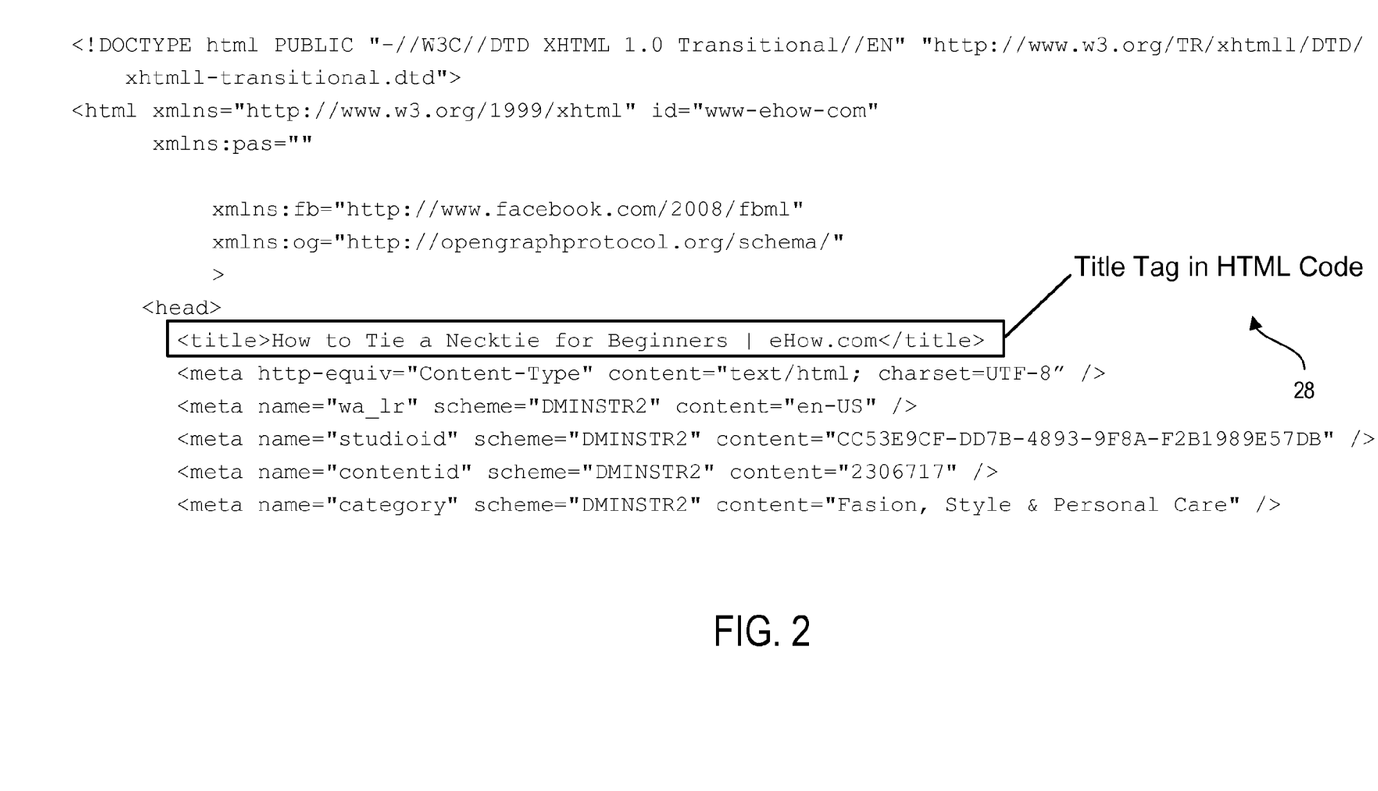
FIG. 2 illustrates a title tag in a web page source code.

As can be appreciated, the storage device 22 may be used to store, arrange and retrieve data, for example, a plurality of web page titles. Each title may be associated with a respective one of a plurality of web pages. Each web page title may be a title tag in a web page's source code. The title tag is generally near the very top of a web page source code and is presented in a certain structured format. For example, FIG. 2 illustrates a title tag 28 in a web page source code. In one embodiment, the storage device 22 stores, in a title database, the at least twenty billion title tags associated with web pages on the internet. The storage device 22 may also store the entire collection of Internet web page documents, such that each record in the storage device 22 corresponds to a single web page.

The storage device 22 may be a machine-readable medium, which may be any mechanism that provides (i.e. stores and/or transmits) information in a form readable by a processor. For example, the machine-readable medium may be a read only memory (ROM), a random access memory (RAM), a cache, a hard disk drive, a floppy disk drive, a magnetic disk storage media, an optical storage media, a flash memory device or any other device capable of storing information. Additionally, machine-readable medium may also comprise computer storage media and communication media. Machine-readable medium includes volatile and non-volatile, removable and non-removable media implemented in any method or technology for storage of information such as computer-readable instructions, data structures, program modules or other data. Machine-readable medium also includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by a computer.

As shown in FIG. 1, the content source 14 may be an external source for storing and retrieving content material and remotely accessible over the network 18. In one embodiment, the content source 14 may also be an internal source maintained in the computing device 12 or locally coupled to the computing device 12. In one embodiment, the content source 14 may constitute a plurality of smaller sources, or databases, that in the aggregate are represented by the content source 14. The content source 14 may be managed or maintained by third party entities different from those managing the computing device 12 or components thereof. The content material stored and retrieved from the content source 14 may include, but is not limited to, web pages, images, videos, audios, text-based material, and/or links or hyperlinks to images, videos, audios, text-based material and the like. In one embodiment, the content material may also include a plurality of web page titles stored with the content source 14.

The web page title evaluation module 26 may be used to remove at least one nonessential word from each respective title of the plurality of web page titles. In one embodiment, the at least one nonessential word is at least one of a brand name and a stop word. For example, the web page title evaluation module 26 may remove, from each webpage title, nonessential words such as a domain name, a person's name (i.e. Rachel Ray), a company's name (i.e. Ralph Lauren), and other descriptors (i.e. video). The web page title evaluation module 26 may also remove stop words such as "a", "the", "is", "on", "of", "all", "in", "an", and the like, including all punctuation. The at least one nonessential word may be a suffix or a prefix in a title.

FIG. 2 illustrates a compilation of titles with exemplary nonessential words, according to an embodiment of the present disclosure. The titles may be compiled by going through, one by one, the plurality of web page titles stored on storage device 20, removing at least one nonessential word to construct a generic title for each, identifying similar generic titles and compose a list of titles with the same generic title. In this example, the title for a first web page is "How to tie a Necktie for Beginners." Nonessential words for the various web page titles shown in FIG. 2 include, but not limited to, "|eHow.com", "|Akira Daily News", and "|eHow.co.uk".

In one embodiment, the web page title evaluation module 26 may remove the at least one nonessential word from the title of each web page to construct a generic title that identifies the content of each web page. The web page title evaluation module 26 may then identify those web pages, from the plurality of web pages, having the same selected generic title and determine a value for the selected generic title (the selected generic title has been selected from the plurality of titles). For example, the web page title evaluation module 26 may determine a value for a first selected title based on the number of times that the selected title appears in the plurality of titles, and further based on the number of web pages that link to the selected title. Then, a value is determined for a second selected title, and this process may be repeated for additional titles in the title database (including, in one example, calculating a title for each generic title in the database). As an example, the number of times that the selected title appears in the plurality of titles will be a positive integer between 1 and, for example, 100,000. Referring to the example in FIG. 2, the number of times that the selected generic title "How to tie a necktie for beginners" appears in the overall title database is five times (note: these titles are illustrated in FIG. 2 as they existed prior to removing nonessential words). The first title in FIG. 2 may have five web pages that link to it, nine web pages that link to the second title, and so on.

As can be appreciated, when determining the value for each selected title, different counting procedures may be implemented to determine the number of times that the selected title appears in the plurality of titles, and the number of web pages that link to the selected title. For example, if a certain website has multiple copies of articles with the same title, even if the copies are different, all occurrences of the same title on a particular domain may count as one. In one embodiment, the web page title evaluation module 26 may count the number of web pages that link to the selected title, except those that reside on the same domain.

For example, if CNN.com has 10,000 links to "How to Tie a Necktie for Beginners|ehow.com" in FIG. 2, that may only count as one for this title. Furthermore, if ehow.com links to that article, then that may count as a zero since the domain the article lives on is excluded. If CNN.com links to "How to Tie a Necktie for Beginners|ehow.com" and also "How to Tie a Necktie for Beginners|Akira Daily News," then each of those two articles counts for one. Additionally, if "How to Tie a Necktie for Beginners|ehow.com" links to "How to Tie a Necktie for Beginners|Akira Daily News" and "How to Tie a Necktie for Beginners|Akira Daily News" links to "How to Tie a Necktie for Beginners|ehow.com," each of those pages receives one count. These counting procedures are merely exemplary and are not limited to any particular application nor is it limited by the examples described above.

In one embodiment, the number of times each title appears on the Internet and the number of websites that link to those pages are statistical surrogates for demand or commercial appeal. As can be appreciated, the value determined for the selected title, via the web page title evaluation module 26, may be used to provide an automated objective assessment of the selected title's demand and commercial appeal.

Various statistical methods may be implemented to objectively evaluate the selected title's demand and commercial appeal. In one embodiment, the web page title evaluation module 26 may perform a weighted calculation to provide an output title value for quantifying the selected title's demand and commercial appeal. This analysis automatically evaluates whether a specific title is likely to be a good title. For example, evaluating whether a title where there is one occurrence on the Internet and has 1000 inbound links, or where there are ten occurrences that each has 100 inbound links, is a better title. According to one embodiment, greater weight may be attributed to the number of occurrences on the internet than the links to the content. In one embodiment, the title value may be determined objectively by performing the following exemplary calculation:

$$\text{Title Value} = O + L$$

where,
$O$ = number of occurrences that the selected title appears on the internet, and
$L$ = number of web pages that link to the selected title.

In one embodiment, the title value may be determined objectively by performing the following exemplary calculation:

$$\text{Title Value} = O \times L$$

where,
$O$ = number of occurrences that the selected title appears on the internet, and
$L$ = number of web pages that link to the selected title.

Alternatively, the title value may also be determined by selecting the higher of the two numbers: the number of occurrences on the internet and the number of links to the content. Other combinations of factors, using caps for the values, log values, and other computational forms can be used to compute this as well.

Hence, in the above example, using the first exemplary calculation, the value for the first title is 1001 and for the second title is 1010. As such, the second title has a greater value than the first title. In one embodiment, if the title value is greater than a first threshold level, the web page title evaluation module 26 may identify the selected title for online publication. Hence, for example, if the first threshold level is 1005, then the first title does not meet the threshold, while the second title may be selected for online publication.

A new web page associated with the title selected for online publication may then be published on the internet. In one embodiment, a web page publisher may be located for publishing a new article with the title selected. The web page publisher may, for example, be computing device 12 or a third party website. Once a web page publisher is located, a writer/author may then be selected to write the new article associated with the title selected. The web page publisher may then publish the new article on the internet on a new web page. For example, the new web page may be stored in storage device 22 and accessible via network 18. In other embodiments, separate servers may be used to publish the new web page.

In one embodiment, the computing device 12 may include an n-gram evaluation module 26 to further evaluate the commercial quality of a web page title. The n-gram evaluation module 26 may be used to determine at least one n-gram for a group of web pages having a given selected generic title. As used herein, an n-gram is a sequence of items in a series. In the context of an article, an n-gram is a sequence of words in the article. For instance, in this paragraph, the n-gram "a sequence of" is used twice. Because it contains three elements, it is referred to as a 3-gram.

The n-gram evaluation module 26 may be used to determine all the 2-grams, 3-grams, 4-grams, and so on, which occur in articles of a certain selected generic title. From those n-grams determined, the n-gram evaluation module 26 may then identify the number of those n-grams that occur in more than one article of a given title. In one embodiment, the n-gram evaluation module 26 may determine an n-gram score for each respective n-gram of the at least one n-gram based on the number of occurrences of the respective n-gram in the group of web pages. For example, the n-gram score may be determined by multiplying the number of web pages in the group of web pages by a number of occurrences of the respective n-gram in the group of web pages. For instance, of the five articles linked to the web page titles, "How to Tie a Necktie for Beginners" of FIG. 2, the n-gram "tying a tie" occurred a total of 12 times in 4 of the 5 articles. Therefore, the n-gram has a score of 48 (12×4).

In one embodiment, the number of occurrences of the respective n-gram in the group of web pages may be capped at predetermined threshold number, for example, three, to prevent any one web page from skewing the n-gram score. In one embodiment, higher n-grams (i.e. 4-gram is higher than 2-gram) may be weighted higher than lower n-grams (i.e. 2-gram is lower than 4-gram) for computing the n-gram score. Once the n-gram score is computed for the n-grams in articles of a certain selected generic title, the n-gram evaluation module 26 may select a certain number of top n-gram scores, for example, the top three n-gram scores are selected.

The n-gram evaluation module 26 may be used to assign a dollar value for each n-gram, having the selected n-gram scores, to monetize as a keyword search term. The n-gram evaluation module 26 may select a first n-gram score, from the selected top three n-gram scores, and associate a search term bid price with the first n-gram score. For example, the top scoring n-grams for a group of articles (i.e., web pages each having one of these articles) with the same title may be looked up against any of the commercial services that report bid prices for search terms. In one embodiment, the average of those values may be attributed to the web page title and regarded as a factor for also monetizing the title as a keyword search term.

In one embodiment, publication of a web page with the selected title may be conditioned on the search term bid price of an n-gram being greater than a certain threshold level. In one embodiment, the threshold level may correspond to a value for which some profit can be earned after the costs of content creation and publication.

Artisans would appreciate that the methods, embodied in the present disclosure, may be utilized on titles in any language, even if the operator does not speak or read the language. As such, one may identify foreign titles with high demand or commercial appeal, and known to monetize without any demand data or even understanding the language the titles are in.

In one embodiment, the web page title evaluation module 24 and the n-gram module 26 may be implemented together in the computing device 12, as shown in FIG. 1. Alternatively, the web page title evaluation module 24 and the n-gram module 26 may also be implemented in separate computing devices coupled locally or remotely over the network 18.

As used herein, the term module refers to logic embodied in hardware or firmware, or to a collection of software instructions, possibly having entry and exit points, written in a programming language, such as, for example, C++. A software module may be compiled and linked into an executable program, or installed in a dynamic link library, or may be written in an interpretive language such as BASIC. It will be appreciated that software modules may be callable from other modules, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays. The modules described herein are preferably implemented as software modules, but could be represented in hardware or firmware.

In one embodiment, each module is provided as a modular code object, where the code objects typically interact through a set of standardized function calls. In one embodiment, the code objects are written in a suitable software language such as C++, but the code objects can be written in any low level or high level language. In one embodiment, the code modules are implemented in C++ and compiled on a computer running a content server, such as, for example, Microsoft® IIS or Linux® Apache. Alternatively, the code modules can be compiled with their own front end on a kiosk, or can be compiled on a cluster of server machines serving interactive television content through a cable, packet, telephone, satellite, or other telecommunications network. Artisans of skill in the art will recognize that any number of implementations, including code implementations directly to hardware, are also possible.

Figure 3:
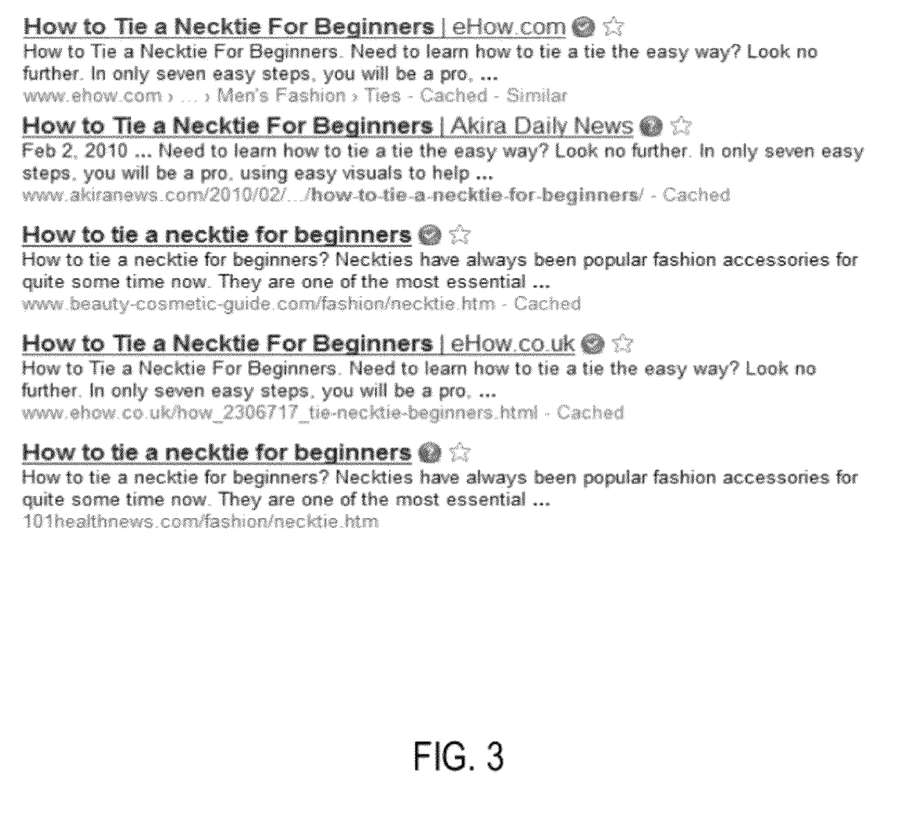
FIG. 3 illustrates a compilation of titles with exemplary nonessential words, according to an embodiment of the present disclosure.

FIG. 3 is an exemplary flow chart 32 outlining an operation of the data processing system 10 of FIG. 1, according to one embodiment of the present disclosure. As can be appreciated, the at least one processor 20 of the computing device 12 may be programmed with code instructions to remove at least one nonessential word from each title of a plurality of titles (34). Each title is associated with a respective one of a plurality of web pages. The at least one nonessential word is at least one of a brand name and a stop word. The at least one processor 20 of the computing device 12 may be further programmed with code instructions to select a title from a plurality of titles (36) and determine a value for the selected title (38). The value may be based on the number of times that the selected title appears in the plurality of titles, and on the number of web pages that link to the selected title. If the value is greater than a first threshold level, the at least one processor 20 may identify the selected title for online publication (40). In one embodiment, the at least one processor 20 of the computing device 12 may be further programmed with code instructions to publish a new web page associated with the selected title (42).

Figure 4:
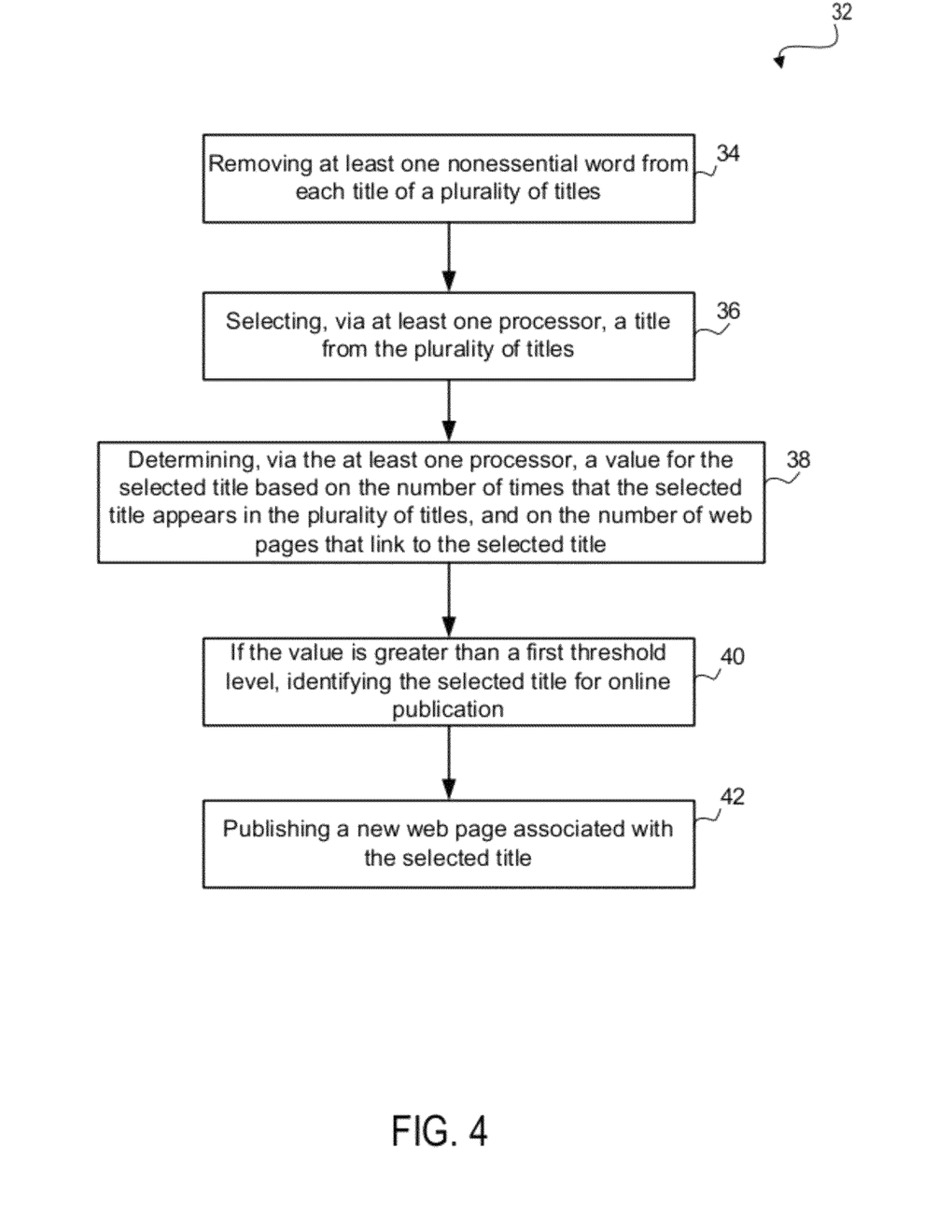
FIG. 4 is an exemplary flow chart outlining an operation of the data processing system of FIG. 1, according to one embodiment of the present disclosure.
Figure 5:
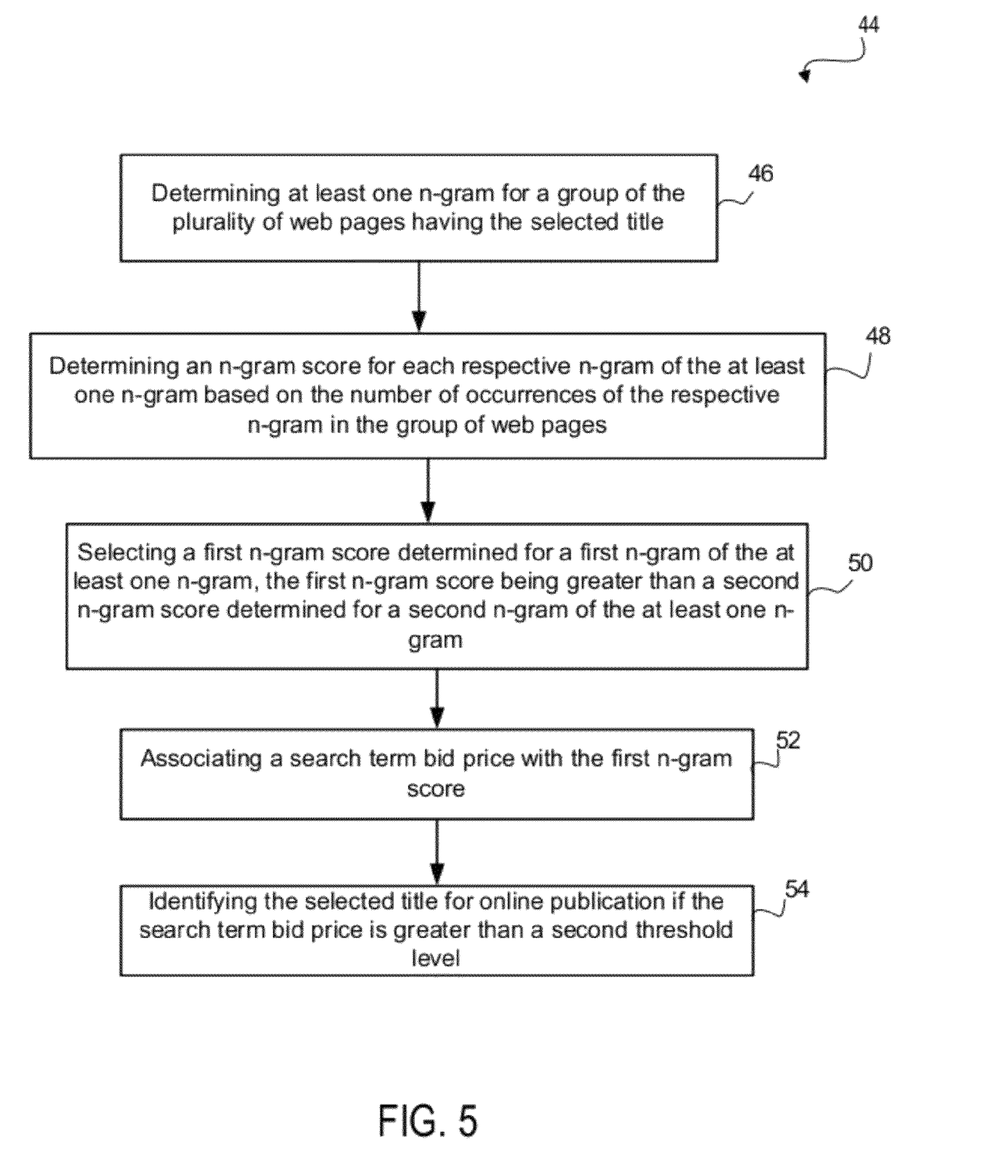
FIG. 5 is an exemplary flow chart outlining an operation of the data processing system of FIG. 1, according to one embodiment of the present disclosure.

FIG. 4 is an exemplary flow chart 44 outlining an operation of the data processing system 10 of FIG. 1, according to one embodiment of the present disclosure. As can be appreciated, the at least one processor 20 of the computing device 12 may be programmed with code instructions to determine at least one n-gram for a group of the plurality of web pages having the selected title (46) and determine an n-gram score for each respective n-gram of the at least one n-gram based on the number of occurrences of the respective n-gram in the group of web pages (48). In one embodiment, the n-gram score may be determined by multiplying the number of web pages in the group of web pages by a number of occurrences of the respective n-gram in the group of web pages. The at least one processor 20 of the computing device 12 may be further programmed with code instructions to select a first n-gram score determined for a first n-gram (50) and associate a search term bid price with the first n-gram score (52). The first n-gram score being greater than a second n-gram score determined for a second n-gram of the at least one n-gram. In one embodiment, the at least one processor 20 of the computing device 12 may be further programmed with code instructions to identify the selected title for online publication if the search term bid price is greater than a second threshold level (54).

As can be appreciated, the present disclosure may be used for various applications to identify titles with demand and commercial appeal.

In this description, various functions and operations may be described as being performed by or caused by software code to simplify description. However, those skilled in the art will recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system. While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time. Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

The computer-readable media may store the instructions. In general, a tangible machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system. Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The disclosure includes methods and apparatuses which perform these methods, including data processing systems which perform these methods, and computer readable media containing instructions which when executed on data processing systems cause the systems to perform these methods.

While the methods and systems have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

It should also be understood that a variety of changes may be made without departing from the essence of the invention. Such changes are also implicitly included in the description. They still fall within the scope of this invention. It should be understood that this disclosure is intended to yield a patent covering numerous aspects of the invention both independently and as an overall system and in both method and apparatus modes.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these.

Particularly, it should be understood that as the disclosure relates to elements of the invention, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this invention is entitled.

It should be understood that all actions may be expressed as a means for taking that action or as an element which causes that action.

Similarly, each physical element disclosed should be understood to encompass a disclosure of the action which that physical element facilitates.

In this regard it should be understood that for practical reasons and so as to avoid adding potentially hundreds of claims, the applicant has presented claims with initial dependencies only.

To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive forms so as to afford the applicant the broadest coverage legally permissible in accordance with the following claims.

The invention claimed is:

1. A method for identifying a title to associate with a new web page to be published, the method comprising:
   selecting, by a computer system, a title from a plurality of titles, wherein each title is associated with a respective one of a plurality of web pages;
   determining, by the computer system, a value for the selected title, wherein the value is based on the number of times that the selected title appears in the plurality of titles, and is further based on the number of web pages that link to the selected title;
   determining a plurality of n-grams for a group of the plurality of web pages having the selected title;
   selecting a first n-gram score determined for a first n-gram of the plurality of n-grams, the first n-gram score being greater than a second n-gram score determined for a second n-gram of the plurality of n-grams;
   associating a search term bid price with the first n-gram score; and
   in response to the value exceeding a first threshold level and the search term bid price exceeding a second threshold level, identifying the selected title to associate with the new web page to be published, wherein the second threshold level corresponds to a value at which a profit is earned after costs of creating and publishing the web page.

2. The method of claim 1, further comprising prior to selecting the title, removing at least one nonessential word from each respective title of the plurality of titles, wherein the at least one nonessential word is at least one of a brand name and a stop word.

3. The method of claim 1, wherein the first n-gram score and the second n-gram score are each based on the number of occurrences of the respective n-gram in the group of web pages.

4. The method of claim 3, wherein the determining the n-gram score comprises multiplying the number of web pages in the group of web pages by a number of occurrences of the respective n-gram in the group of web pages.

5. The method of claim 1, further comprising publishing a new web page associated with the selected title.

6. A tangible, non-transitory computer readable medium having stored thereon a set of instructions, which when executed by a computer having a processor and a storage medium, cause the computer to perform operations, comprising:
   selecting a title from a plurality of titles, wherein each title is associated with a respective one of a plurality of web pages;
   determining a value for the selected title, wherein the value is based on the number of times that the selected title appears in the plurality of titles, and is further based on the number of web pages that link to the selected title;
   determining a plurality of n-grams for a group of the plurality of web pages having the selected title;
   selecting a first n-gram score determined for a first n-gram of the plurality of n-grams, the first n-gram score being greater than a second n-gram score determined for a second n-gram of the plurality of n-grams;
   associating a search term bid price with the first n-gram score; and
   in response to the value exceeding a first threshold level and the search term bid price exceeding a second threshold level, identifying the selected title to associate with a new web page to be published, wherein the second threshold level corresponds to a value at which a profit is earned after costs of creating and publishing the web gape.

7. The computer readable medium of claim 6, wherein the operations further comprise prior to selecting the title, removing at least one nonessential word from each respective title of the plurality of titles, wherein the at least one nonessential word is at least one of a brand name and a stop word.

8. The computer readable medium of claim 6, wherein the first n-gram score and the second n-gram score are each based on the number of occurrences of the respective n-gram in the group of web pages.

9. The computer readable medium of claim 6, wherein the operations further comprise publishing a new web page associated with the selected title.

10. A data processing system comprising:
    a processor; and
    a storage device coupled to the processor and storing a plurality of titles, wherein each title is associated with a respective one of a plurality of web pages, the storage device further storing instructions, that, when executed by the processor, cause the data processing system to:
    select a title from the plurality of titles, determine a value for the selected title, wherein the value is based on the number of times that the selected title appears in the plurality of titles, and is further based on the number of web pages that link to the selected title;
    determine a plurality of n-grams for a group of the plurality of web pages having the selected title;
    select a first n-gram score determined for a first n-gram of the plurality of n-grams, the first n-gram score being greater than a second n-gram score determined for a second n-gram of the plurality of n-grams;
    associate a search term bid price with the first n-gram score; and
    in response to the value exceeding a first threshold level and the search term bid price exceeding a second threshold level, identify the selected title to associate with a new web page to be published, wherein the second threshold level corresponds to a value at which a profit is earned after costs of creating and publishing the web one.

11. The data processing system of claim 10, wherein the storage device further stores instructions to cause the data processing system to, prior to selecting the title, remove at least one nonessential word from each respective title of the plurality of titles, and wherein the at least one nonessential word is at least one of a brand name and a stop word.

12. The data processing system of claim 10, wherein the first n-gram score and the second n-gram score are each based on the number of occurrences of the respective n-gram in the group of web pages.

13. The data processing system of claim 10, the storage device further stores instructions to cause the data processing system to publish a new web page associated with the selected title.

14. The method of claim 1, wherein each respective title in the plurality of titles is contained in a title tag of the respective web page with which the respective title is associated.

15. The computer-readable medium of claim 6, wherein each respective title in the plurality of titles is contained in a title tag of the respective web page with which the respective title is associated.

16. The data processing system of claim 10, wherein each respective title in the plurality of titles is contained in a title tag of the respective web page with which the respective title is associated.

* * * * *